A. L. Johnson.
Iron Shutter.
No. 307
Reissued Apr. 24, 1866.
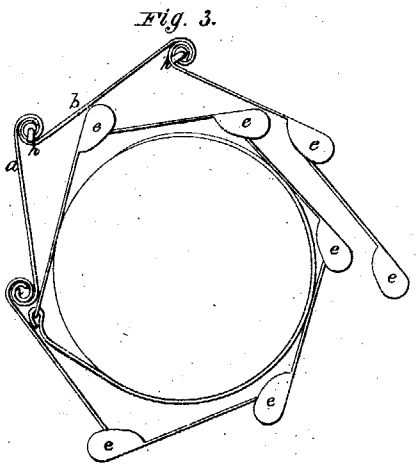
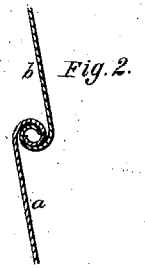
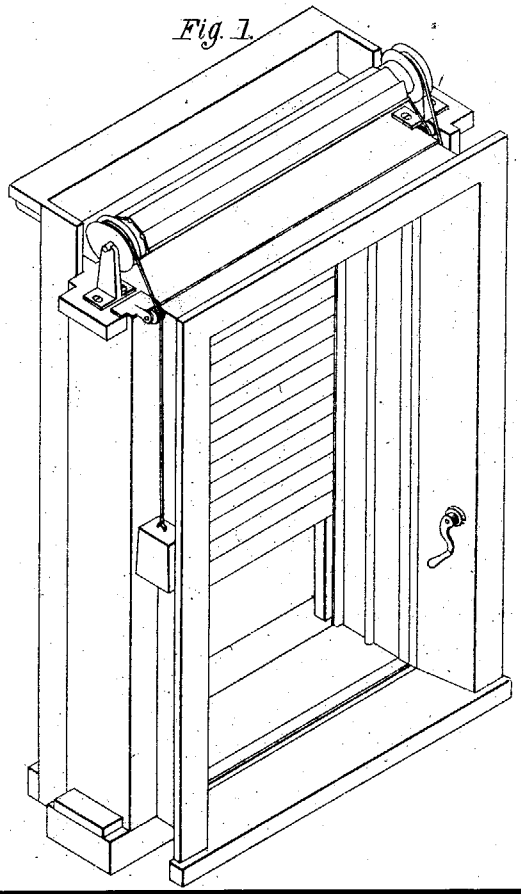

UNITED STATES PATENT OFFICE.

A. LIVINGSTON JOHNSON, OF BALTIMORE, MARYLAND.

IMPROVEMENT IN HINGES OF ROLLING IRON SHUTTERS.

Specification forming part of Letters Patent No. 7,457, dated June 25, 1850; Reissue No. 307, dated April 24, 1855.

*To all whom it may concern:*

Be it known that I, A. LIVINGSTON JOHNSON, of Baltimore, in the State of Maryland, have invented certain Improvements in the Construction of Metal Shutters; and I do hereby declare the following to be a full, clear, and exact description thereof, reference being had to the accompanying drawings, in which—

Figure 1 is a perspective view of the shutter, window-frame, &c. Fig. 2 is an enlarged section of one of the joints; Fig. 3, a section of the blind rolled up.

My invention consists in certain important improvements in the hinge connecting the slats of metal blinds formed by locking the edges of the plates of sheets of metal by curling them within each other. These improvements enable me to form from strips of thin sheet metal stiff and permanent slats, which can be rolled up like a blind, and which at the same time shall possess strength sufficient to resist the attack of burglars though made of metal so thin that in any other form it would be entirely insufficient.

Rolling metal shutters have long been known, and I now have another patent for important improvements therein; but in those shutters very stout metal plates are required in order to give them sufficient strength, the slats of which the shutter is composed being flat bars of metal, with straight smooth edges. In my present shutter I can use very thin metal for any breadth of shutters, as its stiffness is dependent on the shape of the slats, and not on the weight of the metal. There are no projections beyond the joints, and they require no rib-pieces to strengthen them, and the expense is less than most metal shutters, as their manufacture is simple and the weight of material is small.

The construction is as follows: I take a number of thin strips of metal of a length sufficient for the breadth of the shutter, and the width sufficient to form a single slat, and turn their upper and lower edges into the curves shown at *a b*, Fig. 2. The edge *a*, it will be seen, may be carried round farther than that lettered *b*, in which, further to strengthen it a rod or wire, *h*, may be inclosed. The portion *b* is formed to lock into the curve *a*, as shown by the red lines in the same figure, and to unite them the part *b* must be shoved lengthwise into the part *a*, where they are perfectly locked and form a joint to permit them to turn sufficiently to wind on a cylinder above when rolled up. To prevent the slats from sliding out of place and binding, I turn down the ends, projected for that purpose, after the parts are put together, which holds them securely in place and adds strength to the joints by preventing any lateral motion of the slats on each other; and also to make an even edge to the shutter, so that it shall slide smoothly in the window-frame, I project a portion of the end of each slat beyond the end line of its face, as at *e*, and turning it down at right angles, and making a neat finish to the edge. A head may be formed on the rod or wire, or the end thereof bent down when it is used for the same purpose as the bent ends of the plates as above described. The same object may be obtained by attaching a small piece of metal to the ends of the slats so formed as to cover the ends of the joints.

Having thus fully described my improvements, what I claim therein as new, and for which I desire to secure Letters Patent, is—

Constructing shutters of slats of sheet metal with joints formed by curving the edges of the slats, as described, and securing them in place in the manner specified—viz, either by turning down projections from or attachments to the ends of the slats, and thus forming an even edge to the shutters, or by means of wires inserted in the curves and bent or headed at the ends, the shutters sliding up and down in the grooves of the window-frame in which it is placed, the whole being constructed as substantially as herein specified.

A. LIVINGSTON JOHNSON.

Witnesses:

JACOB HATZEL, Jr.,
WM. GREENOUGH.